United States Patent [19]

Preis et al.

[11] Patent Number: 4,884,203

[45] Date of Patent: Nov. 28, 1989

[54] METHOD FOR INFLUENCING THE DRIVING SPEED OF A MOTOR VEHICLE AND APPARATUS THEREFOR

[75] Inventors: Karl-Heinz Preis, Bühlertal; Eberhard Schnaibel, Hemmingen, both of Fed. Rep. of Germany

[73] Assignee: Robert Bosch GmbH, Stuttgart, Fed. Rep. of Germany

[21] Appl. No.: 151,623

[22] Filed: Feb. 2, 1988

[30] Foreign Application Priority Data

Feb. 6, 1987 [DE] Fed. Rep. of Germany ....... 3703645

[51] Int. Cl.$^4$ ...................... G05D 13/60; B60K 31/00
[52] U.S. Cl. ................................. 364/426.04; 180/179; 364/162
[58] Field of Search ............... 180/176, 177, 178, 179; 364/426.04, 161, 162, 163; 123/361

[56] References Cited

U.S. PATENT DOCUMENTS

| | | | |
|---|---|---|---|
| 4,094,378 | 6/1978 | Scheyhing et al. | 180/176 |
| 4,098,367 | 7/1978 | Fleischer | 180/179 X |
| 4,169,437 | 10/1979 | Fleischer | 123/361 |
| 4,337,511 | 6/1982 | Schneider et al. | 364/426.04 |
| 4,425,888 | 1/1984 | Engel et al. | 180/179 X |
| 4,451,890 | 5/1984 | Suzuki et al. | 364/426.04 |
| 4,577,718 | 3/1986 | Ueno | 180/179 |
| 4,698,762 | 10/1987 | Moriya et al. | 364/426.04 |
| 4,729,104 | 3/1988 | Hara | 364/426,04 |
| 4,747,051 | 5/1988 | Hall et al. | 364/426.04 |

Primary Examiner—Felix D. Gruber
Attorney, Agent, or Firm—Walter Ottesen

[57] ABSTRACT

The invention is directed to a method and apparatus for influencing the driving speed of a motor vehicle. The apparatus includes an electronic control unit which includes a microcomputer and a memory. In the control unit, a controller is implemented for the driving speed of the vehicle which is chargeable with an adapted proportional amplification and an integral amplification in dependence on selected and actual driving conditions of the vehicle. The driving modes of "accelerate", "decelerate" and "resume" are automatically carried out pursuant to the steps of the method. Smooth transitions between different speeds are obtained by operating the controller as a proportional controller during acceleration phases.

21 Claims, 4 Drawing Sheets

METHOD FOR INFLUENCING THE DRIVING SPEED OF A MOTOR VEHICLE AND APPARATUS THEREFOR

FIELD OF THE INVENTION

The invention relates to a method of influencing the driving speed of a motor equipped with an internal combustion engine in dependence upon an actual speed signal and at least one driving-mode signal independent of the accelerator pedal to which the driving modes of "accelerate" and "decelerate" are assigned. The air/fuel mixture is metered to the engine via an electric-motor operated positioning device driven by a control signal.

BACKGROUND OF THE INVENTION

U.S. Pat. No. 4,098,367 discloses a speed controlling arrangement for a motor vehicle wherein, however, a new desired speed value is suddenly provided during acceleration. Since the vehicle reacts relatively sluggishly, the danger exists that control oscillations will persist at least a few periods after the new desired value is reached. U.S. Pat. 4,094,378 discloses the utilization of a controller having a PD-performance to reduce such overshoots. With such PD-controllers or P-controllers, the control speed is inaccurate after the set-up operation because of different loadings and variable play in the linkage mechanism of the actuator. If on the other hand, an I-controller is utilized in this situation, a reduced driving comfort is obtained.

U.S. Pat. No. 4,169,437 discloses a speed-control arrangement for motor vehicles wherein the desired acceleration and deceleration operations can be definitively controlled from the accelerator-pedal transducer. The foregoing is achieved by evaluating a signal characterizing the position of the accelerator-pedal transducer pursuant to a predetermined function and by utilizing an integrator in the transmitting path of the controller for the driving speed. In this connection, the presetting of definite accelerations occures in the manner of a pure closed-loop control wherein the actual speed is controlled to a desired value. On the one hand, this arrangement presupposes an unconventional utilization of the accelerator-pedal transducer as an acceleration transducer while, on the other hand, inaccuracies in the terminal speed after the acceleration operations can occur, for example, in uneven terrain or by otherwise large influences which act on the vehicle.

U.S. Pat. No. 4,337,511 discloses a speed control arrangement for motor vehicles wherein the actual speed is followed by a ramp-shaped desired speed during acceleration operations so that a softer transition to the particular new terminal speed results and so that this terminal speed is precisely reached in each instance. However, this arrangement requires a large discrete circuit complex and is therefore relatively expensive. Although the operation of this arrangement is fully digital, it does not, without more, permit a component-saving connection with a fuel metering device likewise operating electronically, and especially, not while also utilizing an already available computer in such an electronic fuel metering system.

SUMMARY OF THE INVENTION

In view of the above, it is an object of the invention to provide a speed-control arrangement for motor vehicles which permits a preselected driving speed to be reached or maintained with a high degree of driving comfort. It is another object of the invention to provide such a speed-control arrangement which permits the same to be simplified and made at less cost by utilizing control functions of a computer which is already available. It is still another object of the invention to provide the possibility of influencing the driving speed by preferably bypassing the accelerator-pedal transducer in a speed-control arrangement of the kind described above.

The invention affords the advantage that the driver of the vehicle can influence the driving conditions of the vehicle while bypassing the accelerator-pedal transducer. The method and arrangement according to the invention offer a very high degree of driving comfort when compared to the known methods and arrangements. In this connection, it is especially noted that the driving speed-control arrangement of the invention permits a simple adaptation to the different dynamic behavior of different vehicle types in that the characteristic values specific to a particular vehicle can be stored in the memory of a computer. It is especially advantageous that transitions in driving speed occur smoothly without noticeable transients by means of a control of the integral values of a utilized PI-controller, the control being dependent upon the operating condition.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
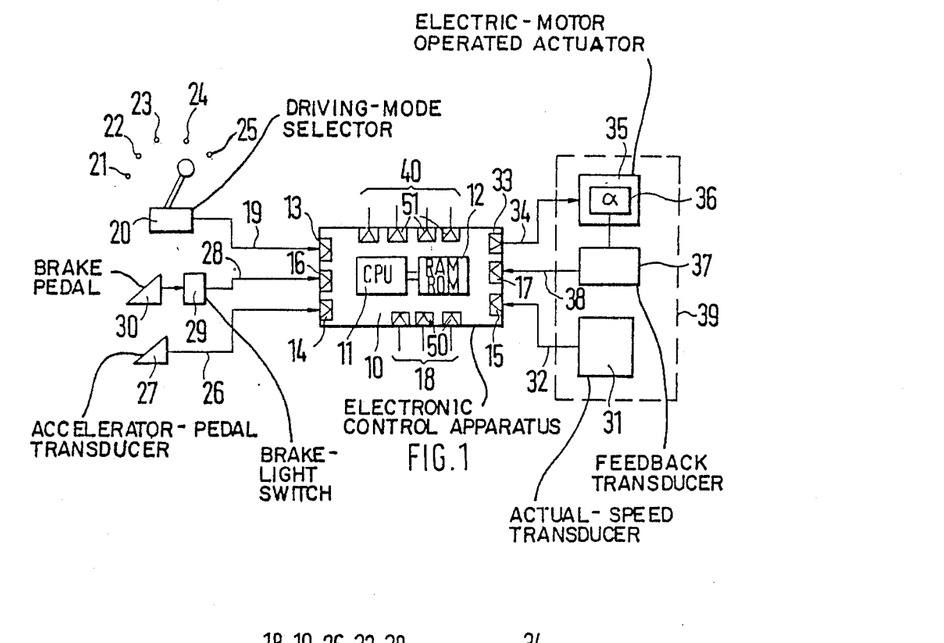
FIG. 1 is a schematic of the individual components of an arrangement according to the invention for influencing the driving speed of a motor vehicle.

The method of influencing the driving speed of a motor vehicle according to the invention is based preferably on an arrangement of the kind shown in FIG. 1. The arrangement shown in FIG. 1 includes an electronic control unit 10 which contains a microcomputer 11 having a read-write memory 12. This control unit 10 has at least the signal inputs (13, 14, 15, 16, and 17). Optimally, still further inputs 50 could be provided. A driving-mode selector 20 is connected to the input 13 via a signal line 19 and has at least two positions (21, 22) and can have still further positions (23, 24 and 25) as may be required. An accelerator-pedal transducer (electrical gas pedal) 27 is connected to input 14 via signal line 26. Input 16 is connected with a brake-light switch 29 via signal line 28. The brake-light switch 29 can be actuated from the brake pedal 30 or from the braking arrangement (not shown). The input 15 of the electronic control apparatus 10 is connected with an actual-speed transducer 31 via a signal line 32. The electronic control apparatus 10 further includes an output 33 which delivers a positioning signal to an electric-motor operated actuator 35 via a line 34. If required, the electronic control apparatus 10 can have still further outputs 51. The electric-motor operated actuator 35 generates a positioning angle α in dependence upon the driving control signal. The positioning angle α is identified in FIG. 1 by reference numeral 36 and can, for example, be the positioning angle of a throttle flap or of a control shaft of a diesel fuel injection pump.

The positioning angle is transmitted to a feedback transducer 37 which transmits a signal corresponding to the actual angular position. This signal is transmitted via connecting line 38 to a further input 17 of the electronic control apparatus. The control path 39 is symbolically represented in FIG. 1 and is defined by the following: the electric-motor operated actuator 35, the actual-value speed transducer 31, the vehicle itself, the internal combustion engine and the wheel-road system. Additional signals can be supplied to further inputs 50 of the electronic control apparatus via additional control lines 18. Such signals can be measured values characterizing especially the different operating conditions of an internal combustion engine. If required, further positioning signals, driving condition informations or alarm signals can be taken from the further outputs 51 via output leads 40. The microcomputer 11 and the RAM/ROM memory 12 in combination with a program conjointly define a PI-controller whose P-amplification and I-amplification are influenceable in dependence upon operating conditions.

For conventional operation, the control apparatus 10 is provided with the driver's desire via the accelerator-pedal transducer 27. By actuating the driving-mode selector 20 into one of the selecting positions 21 to 25, the driver of the vehicle can influence the driving speed in a quasi-automatic manner by bypassing the accelerator pedal 27. The positions 21 to 25 can, for example, correspond to the operating modes of: accelerate, decelerate, resume, off, and maintain speed, respectively. The coaction of the driving-mode selector 20 and the electronic control apparatus 10 preferably occurs so that different manners of response of the electronic control apparatus 10 are provided in the various selected positions 21 to 25. For example, it can be provided that in the selective positions 21 and 22 corresponding to the driving modes of "accelerate" and "decelerate", respectively, the driving speed is influenced in correspondence to the wish of the driver for so long as the driving-mode selector 20 is held in the particular selective position 21 or 22. In contrast thereto, in the other selective positions 23 or 25 corresponding to the driving modes "resume" and "maintain speed", respectively, the driver's desire can be automatically carried out by means of a momentary displacement of the driving-mode selector 20 into the particular selective position.

The function of the arrangement according to the invention for influencing the driving speed of a motor vehicle and the method corresponding thereto in accordance with which this influencing action is undertaken, will now be described with reference to FIGS. 2 to 5.

Figure 2:
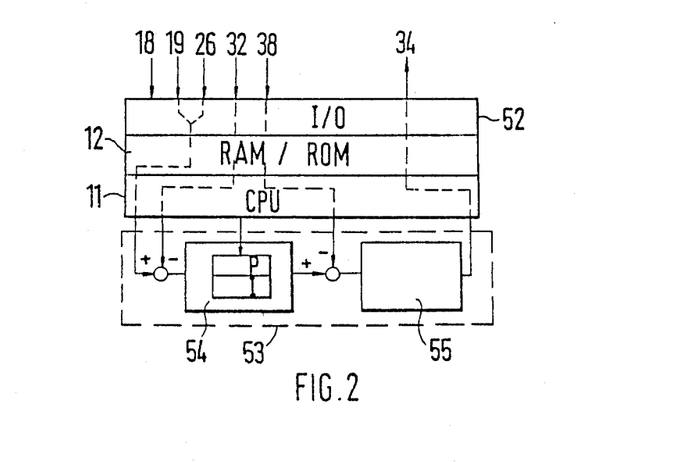
FIG. 2 is a schematic representation of the essential hardware and software components of an electronic control apparatus for influencing the driving speed of a motor vehicle.

The apparatus according to the invention for influencing the driving speed of a motor vehicle can be viewed in FIG. 2 as being in two components. The first component is the so-called hardware module with the microcomputer 11, the read-write memory 12 and an input-output unit 52; whereas, the other component is the software module 53 which implements at least two controllers 54 and 55 in coaction with the hardware module. The first controller 54 is configured as a PI-controller whose P-amplification and I-amplification are adapted by means of setting appropriate values.

Figure 3A:
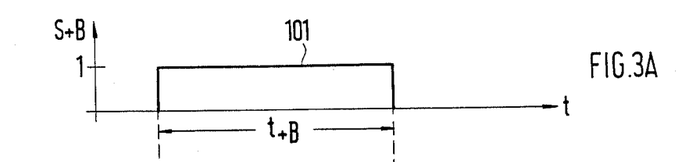
FIGS. 3A to 3C show the time-dependent course of the control signal such as the positioning angle, and the driving speed in dependence upon a desired signal "accelerate" from the driver.
Figure 3B:
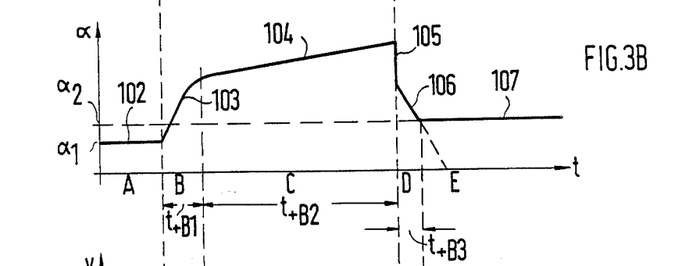
Figure 3C:
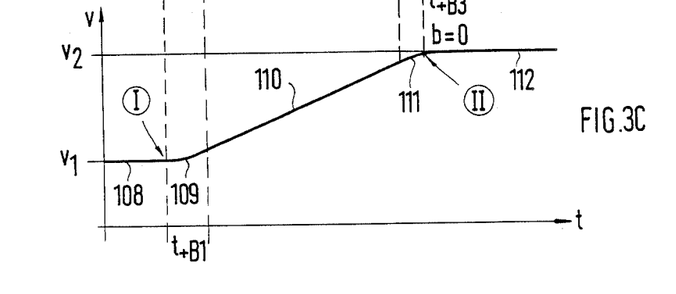

Reference is made in the following to FIG. 3 as an aid in explaining the method and the function for influencing the driving speed of a motor vehicle. For the following description, a driving condition A is presupposed which can be present, for example, because of a previous selection of the driving mode 25 (maintain speed). The constant driving speed $v_1$ and the corresponding position angle $\alpha_1$ for influencing the metering of the fuel mixture into the engine correspond to time courses 102 and 108, respectively. During phase A, the controller 54 operates as a PI-controller with a fixed pregiven P-I part. Therefore, the stationary control difference zero is present in this phase. If the driver desires an acceleration of the vehicle, the driver will position the driving-mode selector 20 into the position 21 (accelerate) for the duration of the driver's desire $t_{+B}$. The driving-mode selector 20 supplies the logic signal 101 of FIG. 3A to the hardware module of the electronic control apparatus 10 for this length of time via the line 19. The beginning of an acceleration operation is identified in FIG. 3C by symbol (I). At the beginning of the acceleration operation, the integral component of the controller is reduced to zero so that the controller functions as a pure proportional controller for the speed during the acceleration phases B, C and D. This means, because of the mass inertia of the vehicle, that the inner control difference increases so far until the acceleration reaches a stationary value with a presetting of a desired speed value increasing linearly with time. This is the situation after the time $t_{+B1}$ at the end of phase B during which the positioning angle α at first changes greatly over the time until a constant inner control difference is reached. This is illustrated in FIG. 3B by the curve 103; whereas, the transition performance of the speed is provided by the time curve 109 given in FIG. 3C. If the selection preceding the selection of position 21 (accelerate) were not the position 25 (maintain speed), and would there have been instead an acceleration operation initiated from a control via the acceleration-pedal transducer 27, then the I-branch of the PI-controller 54 would be precharged with a value held constant during the subsequent acceleration operation in order to prevent a drop in the speed. For this purpose, this value is formed by means of a maximum value selection either from the immediate driver desire obtained via the acceleration-pedal transducer 27 or from an approximation value computed for the particular vehicle from the instantaneous speed.

In this way, the transition to acceleration is obtained without a jolt when the driver lets up on the accelerator pedal before the driver has selected the position 25 on the driving-mode selector 20. As soon as the acceleration of the vehicle has reached a constant value, the positioning angle α increases in correspondence to the curve 104 during the phase C in FIG. 3B at a reduced rate with the time. In FIG. 3C, this corresponds to a ramp-shaped course 110 for the vehicle speed for the time duration $t_{+B2}$ of the phase C.

If the driving mode 21 (accelerate) is switched out on the driving-mode selector 20 after the time duration t+B, the positioning angle $\alpha$ jumps back in correspondence to the time course 105 in FIG. 3B by an amount which is proportional to the absolute value of the positioning angle $\alpha$ directly before switching out the driving mode 21. In this context, various proportionality factors can be utilized in dependence upon the previous absolute value of the positioning angle $\alpha$ with reference to a specific limit angle, for example, 75% of the maximum possible positioning angle $\alpha$. After this back jump, the remaining positioning angle $\alpha$ is reduced in the time $t_{+B3}$ uniformly over the time in correspondence to time course 106 in phase D (see FIG. 3B) until the acceleration zero is detected. The slope of the time course 106 of the positioning angle $\alpha$ is selected to be proportional in amount to the positioning angle $\alpha$ before switching out of the driving mode "accelerate". As soon as the acceleration zero is detected, the output signal of the P-controller is fed into the I-controller as a new initial value. Here, the actual value of the speed is set as the desired value for the PI-controller. In this instant, the P-component becomes zero since the desired-actual control difference is then zero. With this measure, the driving speed is built up without deceleration phase or overshoots. The transition point is identified in FIG. 3C by the symbol (II). It is advantageous to also provide that the drop of the ramp-shaped time course 106 in FIG. 3C be doubled insofar as the driving speed, when reaching zero acceleration, is above the value at the end of phase C by a predetermined amount (for example 1.25 km/h), that is, when switching out of the driving mode "accelerate". It is further provided to store the driving speed as a desired value when the acceleration reaches zero so that it is available for a later desired "resume" mode, if required.

Figure 4A:
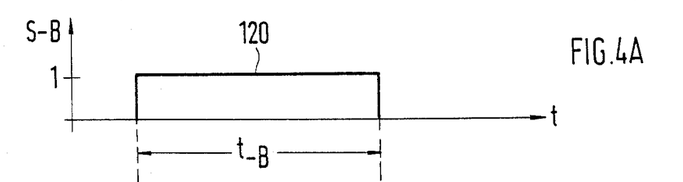
FIGS. 4A to 4C show the time-dependent course of a control signal such as the positioning angle, and the driving speed in dependence upon a desire signal "decelerate" from the driver; and, FIGS. 5A to 5C show a time-dependent course of the control signal such as the positioning angle, and the driving speed in dependence upon a desire signal "resume" from the driver for resuming a speed which was maintained before a deceleration.
Figure 4B:
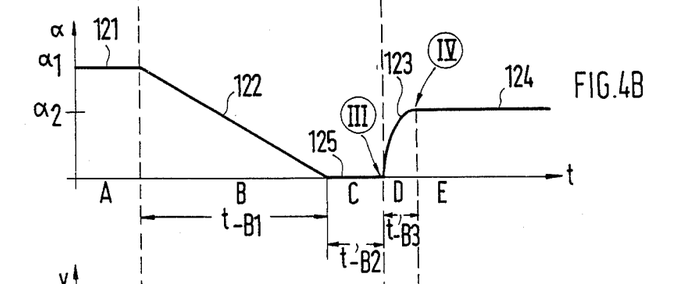
Figure 4C:
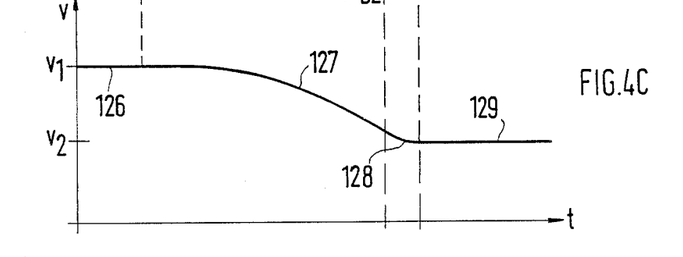

FIG. 4 shows the deceleration of the vehicle from a speed $v_1$ to a speed $v_2$. It is here presupposed that during phase A, a constant speed $v_1$ corresponds to the time course 121 in FIG. 4B and that, in the same manner, also a constant positioning angle $\alpha_1$ corresponds to the time course 126 in FIG. 4C. By selecting the driving mode 22 "decelerate", the driving-mode selector 20 supplies a logical setting signal to the electronic control apparatus 10 for the time duration $t_{-B}$ of the driver's desire; this signal corresponds to the time course 120 in FIG. 4A. As a consequence and during a phase B, the positioning angle $\alpha$ reduces uniformly over the time duration $t_{-B1}$ with a slope which is selected to be proportional in amount to the previous positioning angle $\alpha_1$. In dependence upon this slope, the phase B ends after the time duration $t_{-B1}$ in that the positioning angle $\alpha$ has then assumed its lowest value, preferably, the value zero. If the driver's desire continues longer than it takes to return the positioning angle $\alpha$, the zero-time course 125 of the positioning angle $\alpha$ occurs during the difference time $t_{-B2}$ as shown in FIG. 4B. This phase is characterized with C in FIG. 4. The time course 122 and 125 in phases B and C according to FIG. 4B corresponds to the time course 127 of the speed pursuant to FIG. 4C. If the driving-mode "decelerate" is effective for only a short time, the phase C can then be dropped entirely. The positioning angle $\alpha$ then does not reach its minimal value and the phase B goes over directly into phase D. However, the corresponding course of the speed corresponds also in this case principally to that shown in FIG. 4C. By switching out of the driving-mode "decelerate", the initial value is preplaced into the I-controller in order to support the transient performance of the P-controller. This initial value is formed from a maximal value selection taken from the driver desire (present at the accelerator pedal 27) and an approximation value computed for the particular vehicle from the instantaneous speed. At the same time, the amplification of the P-controller is reduced and thereby controlled to a constant speed. From this, there results at first a relatively steep climbing time course 123 of the positioning angle $\alpha$ during the phase D having the time duration $t_{-B3}$. From this, there occurs a soft transition 128 to a terminal value $v_2$ during phase D. The terminal value $v_2$ is maintained in the subsequent phase E in correspondence to the time course 129 by means of the positioning angle $\alpha_2$ corresponding to the time course 124 in FIG. 4B.

The beginning of phase D is identified in FIG. 4B by (III) and the proportional amplification is reduced with the beginning of phase D and when the acceleration reaches zero at point (IV) at the close of phase D. At the same time, the previous output quantity of P-controller is supplied to the I-controller as a new initial value. At the same time, the actual value of the speed is set as the desired value for the PI-controller. The speed $v_2$ which is reached is then maintained by the PI-controller 54 with an internal control difference of zero. Also here, the speed $v_2$ can be stored in the memory 12 as a desired value when the acceleration reaches zero as may be later required for a desired "resume".

Presupposing a driving speed $v_1$, the resumption (for example, before a braking operation) of a maintained driving speed $v_2$ is illustrated. The operator of the motor vehicle selects the driving-mode 23 (resume) by a short actuation of the selector switch 20. The driving-mode selector 20 then delivers a setting signal to the electronic control apparatus 10 which corresponds to the time course 130 shown in FIG. 5A. Presupposing a speed $v_1$ and its time course 136 in FIG. 5C and the corresponding positioning angle $\alpha_1$ and its time course 131 during the phase A in FIG. 5B, the acceleration operation now runs its course automatically as was already described above with respect to FIG. 3. At the same time, the I-branch of the PI-controller 54 is pre-supplied with a value in the same manner as for the selection of the driving-mode "accelerate"; this value is formed by means of a maximal value selection either from the instantaneous driver desire maintained via the accelerator-pedal transducer 27 or from an approximation value computed from the instantaneous speed and specifically for the vehicle. A difference still is present with respect to FIG. 3 in that the duration $t_4$ of phases B and C do not correspond here to the duration of the effect of a driver desire; instead, this duration $t_4$ is determined by the starting time point and the stopping time point of a desired speed value for the controller 54. This desired speed value increases uniformly with time from the starting speed $v_1$ to the speed $v_2$ which is to be resumed.

Figure 5A:
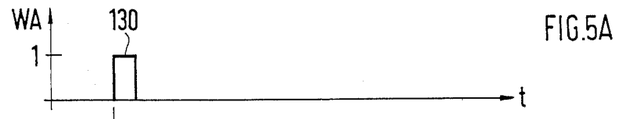
Figure 5B:
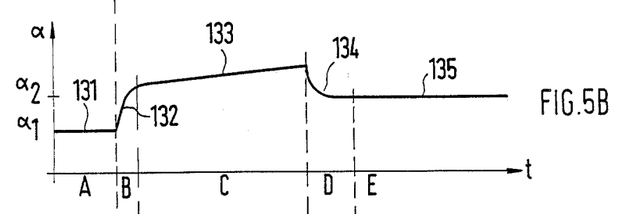
Figure 5C:
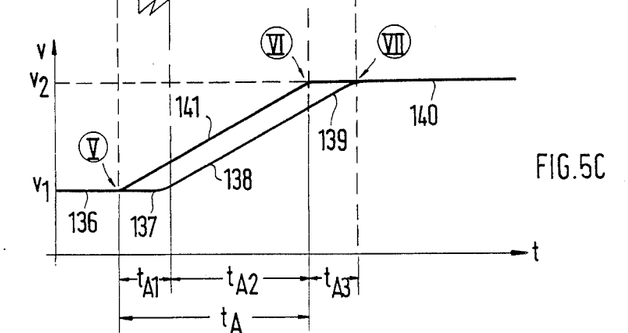

Analogous to the acceleration operation pursuant to FIG. 3, here also the integral amplification of the controller 54 is set to zero and the I-part is held unchanged with the selection of the driving condition "resume" at point (V) in FIG. 5C. Accordingly, the time courses 132 and 133 of the positioning angle in FIG. 5B correspond to the time courses 103 and 104 in FIG. 3B and the time courses 137 and 138 of the speed in FIG. 5C correspond to the time courses 109 and 110 in FIG. 3C. The transition into the phase D during the time $t_{A3}$ can occur in analogy to FIG. 3.

However, an advantageous realization of the transition to the speed $v_2$ which is to be resumed is also possible in that after the duration of time $t_4$ has run, that is at the stop point (VI) of the desired value ramp 141, initially a first greatly reduced integral amplification is supplied to the controller 54; this integral amplification can be selected to be that much greater in correspondence with how much greater the positioning angle $\alpha$ is after the time $t_4$ has run. The controller 54 operates as a proportional controller during phases B and C. The control deviations of controller 54 can occur advantageously by means of stepwise resumption and adaptation of an integral component in that a first or a second integral component is selected before the acceleration reaches zero, this selection being made in dependence upon whether the positioning angle $\alpha$ reached at the end of phase C is lesser or greater than a limit angle $\alpha_{GV}$, for example, 75% of the maximum positioning angle. When the acceleration reaches zero, which corresponds to point (VII) in FIG. 5C, such a transitional integral amplification can be substituted for by another provided for the speed control. The time course 140 of the speed in FIG. 5C corresponds to the time course 135 of the positioning angle $\alpha$ in FIG. 5B and so corresponds again to an inner control difference zero at the PI-controller 54.

The maintenance of the driving speed, which would have been achieved by actuating the accelerator-pedal transducer 27, can occur by selecting the driving-mode 25 (maintain speed) on the driving-mode selector 20. The driving-mode selector 20 can also include a position 24 (out), the selection of which is equivalent to the actuation of the brake of the vehicle and takes the driving speed controller out of operation. If the driving speed which is to be maintained is reached, the P-amplification and the I-amplification can be reduced, preferably in dependence upon time. In this way, a tendency of the driving speed to oscillate is countered.

With an adaption to the electronic control apparatus 10, the driving-mode selector 20 can be so configured that, for example, a short repeated actuation of the driving-mode selector 20 in the positions 21 or 22 can result in a stepwise increase or decrease of the driving speed (for example 1 km/h for each single short actuation). For this purpose, the particular selection time can be compared with a reference value in order to assign a longer-lasting actuation of the selector 20 to the driving conditions described with reference to FIGS. 3 and 4 and to assign a shorter actuation of the selector 20 to the stepwise increase or decrease of a speed which is to be maintained. For increasing the speed (tip-up), the same process as for the function (resume) can be applied for each increment and for reducing the speed, the same process can be applied as for the function (decelerate), so that during transitions from a first to a second speed, the I-components of the controller can be switched off or maintained.

In each case, the time course shown in the particular FIGS. 3B to 5B can represent the course of the effective positioning current (generally, the control value) in a substitutive manner, in lieu of the positioning angle, and still remain within the scope of the invention.

It is understood that the foregoing description is that of the preferred embodiments of the invention and that various changes and modifications may be made thereto without departing from the spirit and scope of the invention as defined in the appended claims.

What is claimed is:

1. A method of influencing the driving speed of a motor vehicle equipped with an internal combustion engine in dependence upon an actual speed signal and at least one driving-mode signal, which is independent of the accelerator pedal, and to which at least the two driving modes of "accelerate" and "decelerate" are assigned, the motor vehicle being equipped with a driving-mode selector for facilitating the selection of said two driving modes of "accelerate" and "decelerate", the method comprising the steps of:
   metering the air/fuel mixture to the engine via an electric-motorized actuator driven by a control signal;
   initially changing said control signal via a computer with a first change rate and then with a second change rate less than said first change rate and uniformly with time;
   thereafter, changing said control signal via said computer uniformly with time during the time phase that at least one of said driving modes is effective;
   changing said control signal via said computer at least in quasi jump-like manner at the end of said time phase; and,
   then changing said control signal via said computer until a driving condition having zero acceleration is reached.

2. The method of claim 1, wherein the motor vehicle is equipped with a driving-mode selector for facilitating the selection of said two driving modes of "accelerate" and "decelerate", and wherein a jump-like set back of said control signal occurs after switching said driving-mode selector out of said "accelerate" mode, said set back being proportional to the control signal directly before said switching.

3. The method of claim 2, wherein said control signal is further reduced uniformly with time until a driving condition having zero acceleration is reached, after said jump-like set back occurs.

4. The method of claim 3, wherein the change rate of the control signal, which is reduced uniformly with time, is proportional to the control signal before said set back.

5. The method of claim 4, wherein at least two different proportionality factors are utilized in dependence upon an increase above and a drop below a pregiven reference value of the control signal before said set back of the latter.

6. The method of claim 5, wherein said two proportionality factors are matched to the motor vehicle and changed adaptively.

7. The method of claim 4, wherein the change rate of the control signal is increased by a predetermined factor when a preset limit value of the driving speed is exceeded.

8. The method of claim 7, wherein said predetermined factor lies in the range from 1.5 to 3.

9. The method of claim 1, wherein the motor vehicle is equipped with a driving-mode selector for facilitating the selection of said two driving modes of "accelerate" and "decelerate", and wherein said control signal is reduced with a first rate of change uniformly with time, said first change rate being proportional to the control signal present before said selector is switched into the driving mode "decelerate".

10. The method of claim 9, wherein a jump-like increase of said control signal occurs with a second rate of change greater than said first rate of change and which reduces uniformly to the value zero when said driving-mode selector is switched out of said driving mode "decelerate".

11. The method of claim 1, wherein the motor vehicle being equipped with a driving-mode selector for facilitating the selection of said tow driving modes "accelerate" and "decelerate" as well as a further driving mode "resume", and wherein, after said further driving mode is switched into, said control signal is initially changed with a first change rate and then with a second change rate less than said first change rate and uniformly with time until a speed, which is to be resumed, is reached.

12. The method of claim 11, wherein said control signal is set back at a uniformly reducing changing rate to a value greater than the corresponding value before switching into said driving mode "resume", said set back occurring after the driving signal which is to be resumed is reached.

13. The method of claim 12, wherein at least two of said driving modes selectable by the driver are activated when said driving-mode selector is switched into said two driving modes for a predetermined minimal duration lying in the range of 0.03 to 0.3 seconds.

14. An apparatus for influencing the driving speed of a motor vehicle equipped with an internal combustion engine in dependence upon an actual speed signal, the apparatus comprising:

actual speed transducer means for providing said actual speed signal;

accelerator-pedal transducer means for providing a first signal indicative of a driver desire;

a driving-mode selector including at least two driving modes selected from the following plurality of driving modes: "accelerate", "decelerate", "resume" and "maintain speed"; said driving-mode selector including switch means for switching into said two driving modes to provide a second signal indicative of a driver desire;

influencing means responsive to a control signal for influencing the air/fuel mixture;

signal means for providing an additional signal indicative of the driving mode of the motor vehicle;

an electronic control apparatus having a plurality of inputs for receiving respective ones of the following: said actual speed signal, said first signal, said second signal and said additional signal; said electronic control apparatus further having an output for providing said control signal;

said electronic control apparatus further including:

a computer having a memory and defining a PI-controller having a P-component and an I-component which are changeable in dependence upon driving mode requirements;

said computer including switching means for switching said P-component and said I-component in dependence upon driving mode requirements; and, said memory of said computer containing permanently stored values specific to a particular vehicle which can be loaded into the program for said computer for determining said P-component and said I-component.

15. The apparatus of claim 14, wherein: during transitions from a first speed to a second speed ("accelerate", "decelerate", "maintain-speed", "resume"), said PI-controller being operable as a P-controller when the I-component is held fixed; and, when such a transition ("maintain-speed") is not present, said PI-controller having a prechargeable I-component and being operable by said computer as a PI-controller.

16. The apparatus of claim 14, said switching means being adapted for switching said I-component off during transitions from a first to a second speed; and, said computer including means for increasing the P-amplification of the controller with respect to that P-amplification in the steady-state condition with the driving speed being held constant.

17. The apparatus of claim 14, said switching means being adapted for switching on said I-component as soon as a driving condition is reached wherein the acceleration is equal to zero; and, means for storing the actual speed value in said memory as a desired value preset.

18. The apparatus of claim 14, said computer including means for changing said P-component and said I-component independently of each other during transition conditions of the motor vehicle from a first constant speed to a second constant speed.

19. The apparatus of claim 18, wherein said changes of said P-component and said I-component occur in a manner that the sum of the I-part and the P-part remain constant during these changes.

20. The apparatus of claim 14, wherein the values stored in said memory include also limit values which represent speed deviation barrier; and, said computer including means for characteristically changing said control signal when said barriers are exceeded and when there if a drop below said barriers.

21. The apparatus of claim 14, wherein changes in speed and therewith the new speeds which are to be provided are adjustable in increments or decrements by means of adequate momentary actuations of the driving-mode selector.

* * * * *

UNITED STATES PATENT AND TRADEMARK OFFICE
CERTIFICATE OF CORRECTION

PATENT NO. : 4,884,203
DATED : November 28, 1989
INVENTOR(S) : Karl-Heinz Preis and Eberhard Schnaibel It is certified that error appears in the above-identified patent and that said Letters Patent is hereby corrected as shown below:

In column 1, line 8, insert -- vehicle -- between "motor" and "equipped".

In column 1, line 41, delete "occures" and substitute -- occurs -- therefor.

In column 5, line 1, delete "t+B," and substitute -- $t_{+B'}$ -- therefor.

In column 5, line 23, delete "phase" and substitute -- phases -- therefor.

In column 6, line 63, insert -- $\alpha$ -- between "angle" and "in FIG. 5B".

In column 9, line 5, delete "tow" and substitute -- two -- therefor.

In column 10, line 46, delete "if" and substitute -- is -- therefor.

Signed and Sealed this

Thirtieth Day of October, 1990

*Attest:*

HARRY F. MANBECK, JR.

*Attesting Officer*  *Commissioner of Patents and Trademarks*